C. G. RENOLD.
DRIVING CHAIN.
APPLICATION FILED AUG. 13, 1913.

1,161,821.

Patented Nov. 23, 1915.

Witnesses:
W. H. Wakefield
Wm. M. Golden

Inventor.
Charles G. Renold
Per William E. Richards
Attorney.

UNITED STATES PATENT OFFICE.

CHARLES G. RENOLD, OF MANCHESTER, ENGLAND.

DRIVING-CHAIN.

1,161,821.  Specification of Letters Patent.  Patented Nov. 23, 1915.

Application filed August 13, 1913. Serial No. 784,543.

*To all whom it may concern:*

Be it known that I, CHARLES GARONNE RENOLD, a subject of the King of Great Britain, and resident of Manchester, in the county of Lancaster, England, have invented certain new and useful Improvements in and Connected with Driving-Chains, of which the following is a specification.

My invention relates to improvements in and connected with the inverted tooth or "silent" type of driving chain and is especially applicable to the said type of chains having joints which consist of a cylindrical stud or rivet capable of turning freely in circular holes in the chain elements or links.

For convenience in assembling and what is more important, in order to allow the chain joints to be adequately lubricated, there must be a certain minimum clearance between the link holes and the studs or rivets which means that the diameter of the hole in the link must be slightly larger than the diameter of the stud or rivet. Now, in practice it has been found that the chain often fails, due to insufficient lubrication at the joint. To overcome this difficulty it is quite feasible to concentrically increase the size of the hole in the link, but this is inadvisable because the chain will extend too much, due to decreased contact between stud and rivet hole, that is to say, when in use, a chain increases in length owing to wear between the stud or rivet and hole at the joint and the slacker the fit, the smaller is the surface of contact which has to take the pull, and therefore the greater the wear.

The object of my invention is to provide means whereby the said defects are overcome, that is to say, means which provide an efficient oil space and at the same time a sufficient wearing surface and obviate increased wear.

To this end according to my invention I form the stud or rivet hole of the chain link in such a manner, that the bearing surface portion thereof is less than a semi-circle and of the same radius as the joint stud or rivet thus closely fitting the latter and the other portion of which is an eccentric cylindrical enlargement more than a semi-circle and of a radius larger than that of the joint stud or rivet, the said enlargement forming an effective oil space and the oil therein being in direct contact with the joint stud or rivet.

I attain these objects by the means illustrated in the accompanying drawing, in which—

Figure 1:
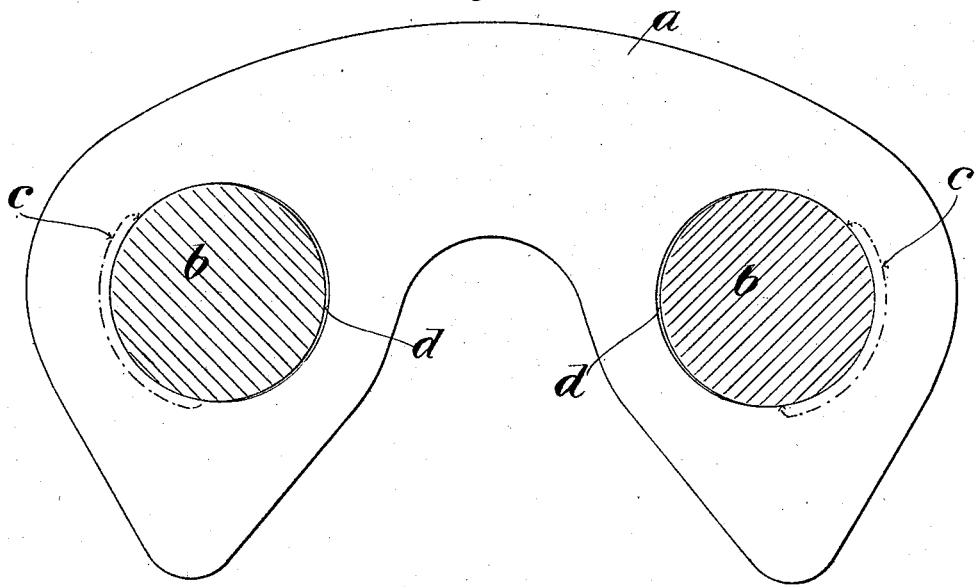
Figure 2:
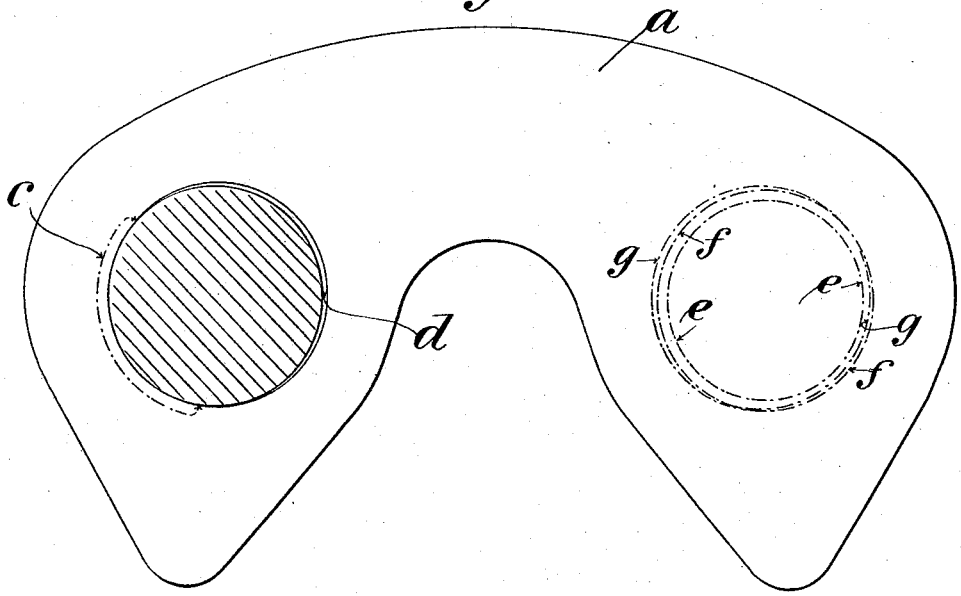

Figure 1 shows a link with stud or rivet holes and clearance space formed as hitherto; Fig. 2 shows a link with my improved form of stud or rivet hole and clearance space and a method of making the same.

Similar letters refer to similar parts throughout the several views.

Referring to the figures generally, $a$ is the link, $b$ are the studs or rivets, $c$ is the bearing portion of the joint stud or rivet hole, $d$ the clearance or oil space therefor.

In carrying out my invention and referring to Fig. 2, in forming my improved joint stud or rivet hole according to one embodiment, I first punch out of the link, a round hole, see dotted circle $e$, right end of link, and then punch out a second or inner hole, see dotted circle $f$, concentric with the hole $e$, and finally a third hole, see dotted circle $g$, slightly eccentric to and intersecting the first hole $e$, the hole $f$ providing the bearing portion $c$ and the hole $g$ the clearance or oil space $d$ for the joint stud or rivet, see left end of link Fig. 2.

According to another embodiment of my invention the first of the said two concentric holes, that is to say, the hole $e$ may be dispensed with and the stud or rivet bearing portion and clearance or oil space formed by two holes or punching only $f$ and $g$ respectively.

A third embodiment of my invention consists of punching out a small hole and then completing the finished stud or rivet hole with extended clearance or oil space by means of a punch of suitable section.

I claim:

1. In a driving chain of the silent type with cylindrical joint studs or rivets, a chain link having a joint stud or rivet hole the bearing portion of which is less than a semi-circle and of the same radius as the joint stud or rivet thus closely fitting the latter and the other portion of which is an eccentric cylindrical enlargement more than a semi-circle and of a radius larger than that of the joint stud or rivet, the said enlargement forming an effective oil space and the oil therein being in direct contact with the joint stud or rivet, for the purpose specified.

2. In a driving chain of the silent type with cylindrical joint studs or rivets, a chain link having a joint stud or rivet hole the bearing portion of which is less than a semicircle and of the same radius as the joint stud or rivet thus closely fitting the latter and the other portion of which is an eccentric cylindrical enlargement more than a semi-circle and of a radius larger than that of the joint stud or rivet, the said enlargement forming an effective oil space and the oil therein being in direct contact with the joint stud or rivet, and the said hole being formed by punching out of each link two cylindrical holes eccentric with each other and of different diameters, the smaller hole corresponding with the diameter of the joint stud or rivet and the larger hole providing the said oil space, for the purpose specified.

Signed at Manchester, in the county of Lancaster, England, this 11th day of July, A. D. 1913.

CHARLES G. RENOLD.

Witnesses:
 ALFRED BOSSHARDT,
 STANLEY W. BRAMALL.

Copies of this patent may be obtained for five cents each, by addressing the "Commissioner of Patents, Washington, D. C."